United States Patent [19]

Otsuki et al.

[11] 4,044,217
[45] Aug. 23, 1977

[54] SLIDING SURFACE WORKING METHOD USING WIRE-EXPLOSION COATING

[75] Inventors: Yukio Otsuki; Hiroyuki Matsumoto, both of Akashi; Hiroshi Ito, Dazaifu; Shusuke Takezaki, Fukuoka, all of Japan

[73] Assignees: Kawasaki Jukogyo Kabushiki Kaisha, Kobe; Nippon Tungsten Co., Ltd., Fukuoka, both of Japan

[21] Appl. No.: 575,169

[22] Filed: May 7, 1975

[51] Int. Cl.² .................................................. B23K 9/04
[52] U.S. Cl. ................................... 219/76; 123/193 C; 219/68; 427/57
[58] Field of Search ............ 123/41.71, 191 A, 193 C; 219/68, 76; 252/12.2; 427/57

[56] References Cited

U.S. PATENT DOCUMENTS

| 2,106,914 | 2/1938 | L'Orange | 123/191 A X |
| 3,348,929 | 10/1967 | Valtschev et al. | 219/76 X |
| 3,387,985 | 6/1968 | Huber | 427/57 |
| 3,663,788 | 5/1972 | Inoue | 219/76 |
| 3,674,544 | 7/1972 | Grosseau | 219/76 X |
| 3,808,955 | 5/1974 | Hamada et al. | 123/193 C X |

*Primary Examiner*—Bruce A. Reynolds
*Assistant Examiner*—N. D. Herkamp

[57] ABSTRACT

There is disclosed a sliding surface working method using wire-explosion spray coating according to which the inner surface of an aluminium alloy cylinder is wire-explosion spray coated using a molybdenum wire, molybdenum-tungsten alloy wire, or tungsten wire. Next, the inner surface is alternately and repeatedly wire-explosion spray coated by alternately wire-explosion spraying a carbon steel wire and a wire of a material having good seizure resistance and wear resistance characteristics. Finally, the inner surface thus coated is ground and finished.

10 Claims, 8 Drawing Figures

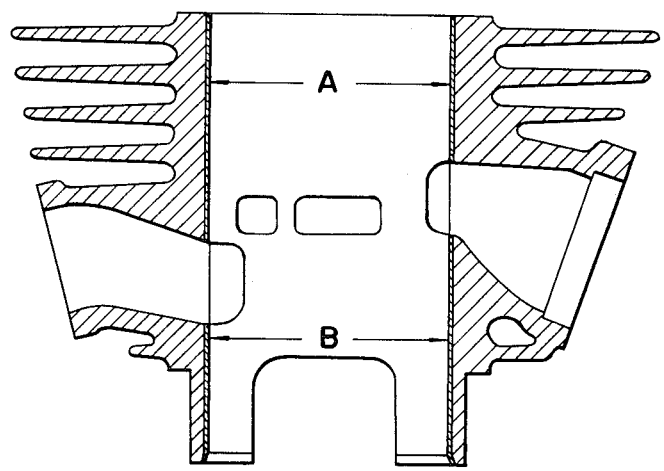
FIG. 3a
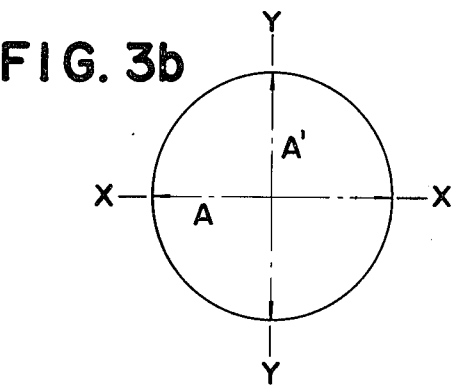
FIG. 3b
FIG. 5
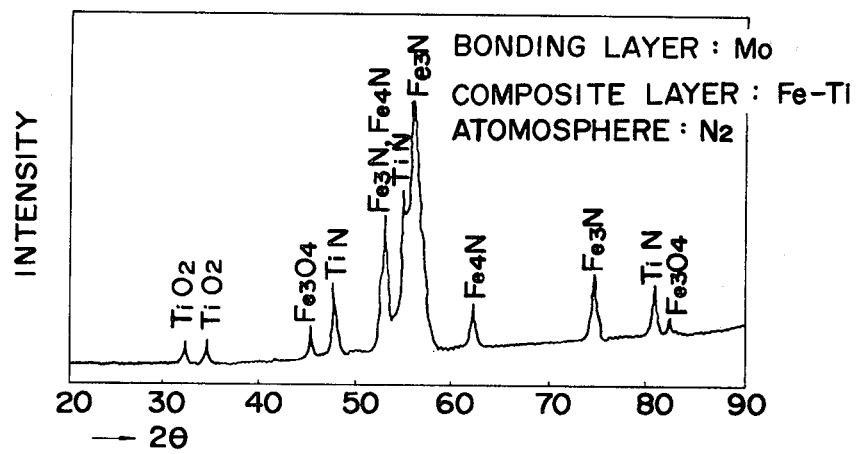

SLIDING SURFACE WORKING METHOD USING WIRE-EXPLOSION COATING

BACKGROUND OF THE INVENTION

1. FIELD OF THE INVENTION

This invention relates to a sliding surface working method using wire-explosion spray coating, and particularly to a sliding surface working method using wire-explosion spray coating, according to which cylinders for use in internal combustion engines having good wear resistance, peel resistance and seizure resistance characteristics and uniform quality can be inexpensively mass-produced without coproduction of an effluent which causes environmental contamination.

2. DESCRIPTION OF THE PRIOR ART

Heretofore, cast iron cylinders or aluminium cylinders having a cast iron liner have been utilized as cylinders for use in internal combustion engines. However, in the modern high performance and high power engine, the conventional cylinder has become insufficient because of its poor cooling characteristics, and this has become a large problem in the production of engine. Recently, in order to overcome this problem, chromium plated aluminium cylinders having the inner sliding surface plated with chromium are being adopted for some applications. However, production of such cylinders relies on a plating process which produces a waste liquor effluent and thus entails a possibility of causing environmental pollution. Further, such a process requires an installation of large scale and the time required for pretreatment, processing and after-treatment is very long. Accordingly, the number of man-hours required per unit is large and the manufacturing cost is correspondingly high.

On the other hand, there have been proposed many kinds of methods for providing metal coating on the inner sliding surface of an aluminium base cylinder by flame-spray coating and the like. In these methods, it has also been known to pre-form a molybdenum bonding layer on the base material by flame-spraying to increase the degree of bonding between the base material and the coating layer.

In the conventional flame-spray coating, however, it has been difficult to inexpensively massproduce cylinders having flame-sprayed coating layer of high density and high smoothness.

SUMMARY OF THE INVENTION

It is, accordingly, one object of this invention to provide a sliding surface working method which eliminates the defects in the prior art mentioned above by using wire-explosion spray coating having the excellent advantages that a coating layer having a high bonding strength can be obtained and that coating can be easily applied to an inner surface of a cylinder.

According to this invention, there is provided a sliding surface working method which comprises the step of, first, wire-explosion spraying a molybdenum wire, molybdenum-tungsten alloy wire, or tungsten wire onto the internal sliding surface of a cylinder made, for example, from aluminium alloy, to pre-form a bonding layer thereon; alternately and repeatedly wire-explosion spraying carbon steel wire and wire of a material having good seizure resistance and wear resistance characteristics onto the bonding layer to form and laminate carbon steel layers which act as a reinforcing member for the sliding surface and good seizure resistance and wear resistance layers; and finally grinding the internal slide surface thus formed to finish it.

BRIEF DESCRIPTION OF THE DRAWINGS

FIGS. 3a and 3b are sectional views of a cylinder showing points at which the amount of wear is measured;

FIG. 5 is a X-ray diffraction graph of the wire-explosion spray coating layer showing the situation of nitride products of iron and titanium.

DESCRIPTION OF PREFERRED EMBODIMENTS

Wire-explosion spraying is a recently developed method wherein a impulsive heavy electric current is passed through a wire material to melt and atomize it in the atmosphere or an inert gas environment, the wire material being instantly melted and exploded to cause the atomized molten particles to fly at a very high speed toward a material to be coated.

This invention relates to melting and spraying specified materials onto the inner surface of a cylinder, such as an aluminium alloy cylinder, in a specified order by using the wire-explosion spraying mentioned above.

As mentioned above, it has been known that in the case of flame-spraying some coating material onto the sliding surface of an aluminium base cylinder, if a molybdenum bonding layer is pre-formed on the sliding surface by flame-spraying the molybdenum, the degree of bonding between the base material and the flame-sprayed coating material is elevated. However, in case of performing wire-explosion spray coating, it is also possible to provide a bonding layer of a high bonding strength made from a high melt temperature material other than molybdenum, such as molybdenum-tungsten alloy or tungsten. Namely, molten particles of, for example molybdenum or tungsten, created by the wire-explosion spraying and having a temperature higher than the melting temperature thereof collide with the aluminium alloy base to bond with the base by a mechanical "anchor effect" and to melt a portion of the base surface layer, resulting in a mixed and diffused condition with the base material. Therefore, the bonding strength between the aluminium alloy base and the wire-explosion spray coating layer reaches above 500 kg/cm². This is a sufficient bonding strength against the heat cycle and mechanical shock to which the coating layer is subjected when it is used as the sliding surface of a cylinder for an internal combustion engine. The thickness of the coating formed by one wire-explosion spraying is about 5 –15μ, and therefore, the number of times of the wire-explosion spraying required for obtaining a bonding layer having a required thickness is one to three times. Four or more wire explosion sprayings are unnecessary to provide such a bonding layer. A bonding layer formed from only one kind of material is not sufficient in wear resistance and seizure resistance to serve as the sliding surface of the internal combustion engine cylinder, and it is necessary to form on the bonding layer coating layers made from different materials and capable of giving required wear resistance and seizure resistance characteristics to the sliding surface.

Figure 1:
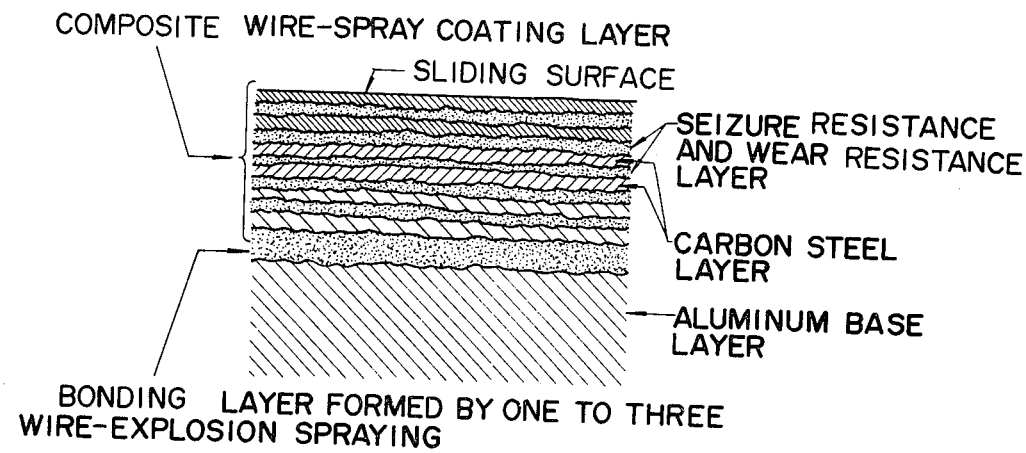
FIG. 1 is a partially enlarged sectional view of a cylinder for use in an internal combustion engine which has been surface-treated by the method according to this invention.

Therefore, after forming the bonding layer by wire-explosion spraying the molybdenum wire, the molybdenum-tungsten alloy wire or the tungsten wire, a carbon steel wire is wire-explosion sprayed on the bonding layer to form a carbon steel layer which acts as a reinforcing member for the sliding surface. Next, a wire material selected from the group consisting of molybdenum wire, molybdenum-tungsten alloy wire, tungsten wire, chromium wire, nickel-chromium alloy wire and titanium wire, is wire-explosion sprayed on the carbon steel layer. Furthermore, the wire-explosion spraying of the carbon steel wire and the wire-explosion spraying of the wire material selected from the six kinds of wires are alternately and repeatedly performed to obtained a composite spray-coating having a thickness of about 50 - 120μ. The two different materials mix in the composite coating layer, and the coating layer becomes a smooth coating having a uniform thickness. Finally, the surface of the composite spray-coating layer is ground and finished to form the sliding surface of the cylinder. The carbon steel contained in the complex wire-explosion spray-coating layer is martensitized and extremely hardened due to the quick cooling after wire-explosion spraying. The composite layer having such carbon steel and the molybdenum (or molybdenum-tungsten alloy, tungsten, chromium, nickel-chromium, or titanium) has pores at a suitable porosity (3 to 5 percents). The pores act as an oil reservoir, thereby giving a excellent wear resistance and seizure resistance characteristics to the sliding surface (ground surface). FIG. 1 shows one example of a section of the sliding surface thus formed.

Figure 2:
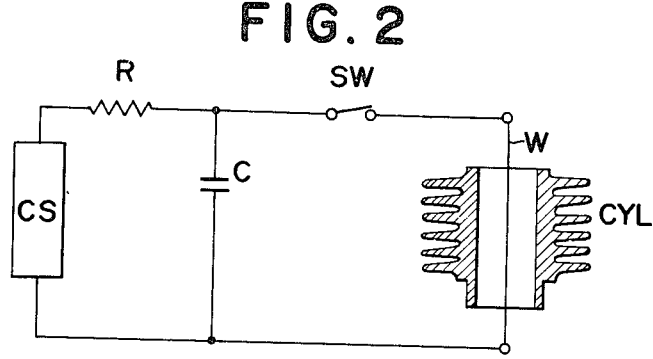
FIG. 2 shows a circuit diagram of a wire-explosion spraying device used to perform wire-explosion spray coating.

Now, embodiments of this invention will be explained. FIG. 2 shows a circuit diagram of a wire-explosion spraying device used for performing wire-explosion spray coating according to this invention. This device comprises a charging device CS, a charging resistor R, a capacitor C having a capacitance of, for example 90 μF, and a discharging switch SW, as shown in the drawing. Metal material W to be sprayed is placed near the material to be coated, for example in the interior of a cylinder CYL to be coated, and is connected between output terminals of the spraying device.

First, an inner surface of an aluminium alloy cylinder having an inner diameter of 80.5 mm and a length of 140 mm was degrease-cleansed with perchloroethylene. A tungsten wire of 1.5 mm in diameter and 180 mm in length was put in the cylinder and wire-explosion sprayed to form a tungsten coating layer on the inner surface using the device mentioned above. This wire-explosion spraying was conducted at a discharge voltage of 18.9 KV. The tungsten coating layer thus formed had a thickness of about 5μ. Next, two wire-explosion sprayed carbon steel layers were formed on the surface by separately wire-explosion spraying two piano wires (SWP) of 1.60 mm in diameter and 180 mm in length in the cylinder at 14.4 KV, and thereafter one molybdenum layer was formed on the carbon steel layers by wire-explosion spraying a molybdenum wire of 1.55 mm in diameter and 180 mm in length in the cylinder at 17.4 KV. Thereafter, the wire-explosion spray coating of two carbon steel layers and one molybdenum layer was repeated 10 times. Thereafter, the surface thus formed was ground to finish the inner surface of the aluminium alloy cylinder having a composite wire-explosion sprayed coating layer of a thickness of about 80μ.

Figure 4:
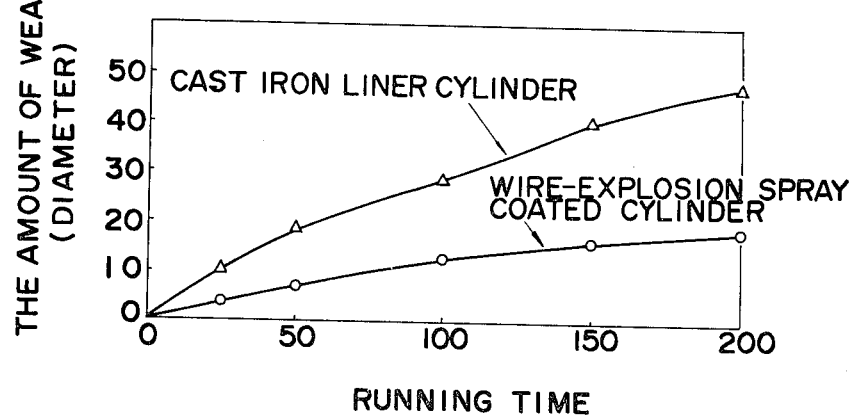
FIG. 4 is a graph showing the amounts of wear in a conventional cast iron liner cylinder and a wire-explosion spray coated cylinder made according to the method of this invention.

The inventors mounted the cylinder thus formed and conventional cast iron liner cylinder and chromium plated cylinder, respectively, on an air-cooled two cycle engine for motorcycle having the displacement of 360 cc (bore × stroke being 80.5 × 68), and tested their performances. FIG. 4 shows the amounts of wear in the cast iron liner cylinder and the wire-explosion spray coated cylinder made according to this invention. FIGS. 3a and 3b show the measuring points of the amount of wear, and the amounts of wear shown in FIG. 4 are average values of the measured values in X and Y directions at the measuring points A, A', B and B'.

As seen from the graph shown in FIG. 4, the amount of wear in the wire-explosion spray coated cylinder made according to this invention is less than a half of that in the cast iron liner cylinder, and the cylinder thus formed has sufficient endurance.

Further, in the wire-explosion spray coated cylinder made according to this invention no peeling off of coating was found after the 200 hours endurance test. On the other hand, a peeling off of the plated coating occurred in the chromium plated cylinder after about 2 hours running test in the same condition.

In the wire-explosion spray coated cylinder, it is possible to thin the coating layer to about 100 - 50μ, and therefore the cylinder has a high thermal conductivity and hence a high cooling performance. Furthermore, the molybdenum and the molybdenum-tungsten alloy having a self-lubrication against a metal seizure, and the pores in the wire-explosion spray coating layer act as an oil reservoir. By the above mentioned actions and properties, the wire-explosion spray coated cylinder has a very excellent seizure resistance compared with that of the cast iron liner cylinder and chromium plated cylinder when they are used with an aluminium piston and cast iron rings.

In the case that a molybdenum-tungsten alloy wire or tungsten wire was wire-explosion sprayed onto the inner surface of an aluminium alloy cylinder to form a bonding layer thereon, and in the case that carbon steel wire and molybdenum-tungsten alloy wire or tungsten wire was alternately and repeatedly wire-explosion sprayed to form a composite coating layer on the bonding layer, the cylinder thus formed had substantially the same effect as that of the embodiment mentioned hereinbefore.

In case of forming a composite coating layer using a chromium wire, a chromium wire formed by an extruding method in a powder metallurgical technique and presintered and sintered in a vacuum furnace, was used as a wire to be sprayed. In this case, a multi-layer composite coating consisting of laminated chromium and carbon steel layers was formed on the bonding layer. The chromium wire-explosion spray coating layer has the Vickers hardness of about 200 - 250 and the carbon steel wire-explosion spray coating layer has the Vickers hardness of about 700 - 800. Since the different layers having such hardness exist in mixed structure in the wire-explosion spray coated composite layer, the composite layer has good wear resistance and heat resistance. Furthermore, since there is a very thin oxide film on the chromium surface, the composite layer also has an excellent seizure resistance.

In case of using, as a nickel-chromium alloy wire, a wire made from "Chroman E" (Fe 16%, Ni 50%, Cr 33%, Mn 1%), since the material contains considerable amount of iron, the formations of one carbon steel layer and one Chroman E layer were alternately and repeatedly performed by wire-explosion spraying carbon steel wires and Chroman E wires. In this case, the composite coating layer had the Vickers hardness of about 700, and had substantially the same effect as that in using chromium.

In case of using a titanium wire, since the titanium coating has a small amount of titanium dioxide produced by the oxidation of titanium when the titanium wire is wire-explosion sprayed in the air atmosphere, the composite coating layer containing titanium has an excellent seizure proof characteristics. Furthermore, when the cylinder having the coating layer thus formed is used in a gasoline engine, since carbon contained in the gasoline fuel reacts with titanium contained in the coating layer by the getter effect to change a portion of the titanium to TiC, the hardness of the coating is elevated and at the same time the seizure resistance characteristics of the coating is increased.

In case of wire-explosion spraying wire materials, for example steel and titanium wires in an nitrogen gas environment, iron and titanium are partially changed to nitrides, as shown in FIG. 5. Therefore, the coating layer formed by the wire-explosion spraying in the nitrogen gas environment has the Vickers hardness of about 900 to 1000. Since the nitrides is excellent in connection with seizure resistance characteristics, the coating layer having such nitrides has an excellent seizure resistance characteristics and also has a good wear resistance characteristics.

In the case of using a composite wire material made from different metal materials, for example, steel and molybdenum, steel and tungsten, steel and chromium, and steel and titanium, different powdered metal material are formed by extruding method in a powder metallurgy technique and presintered and sintered in a vacuum furnace, to become a composite wire material.

Powdered raw material is preferable to have a suitable particle size (for example, about 5µ) so that the two different materials are not perfectly alloying during sintering, thereby maintaining the characteristics of the respective materials contained in the wire when the same is employed in the sprayed coating.

It has been known that molybdenum disulfide and tungsten disulfide are an extremely excellent solid lubricant. By impregnating the wire-explosion spray coating layer with such solid lubricant to fill the pores in the layer therewith, the lubrication characteristics and the seizure resistance characteristics of the cylinder were improved.

Figure 6A:
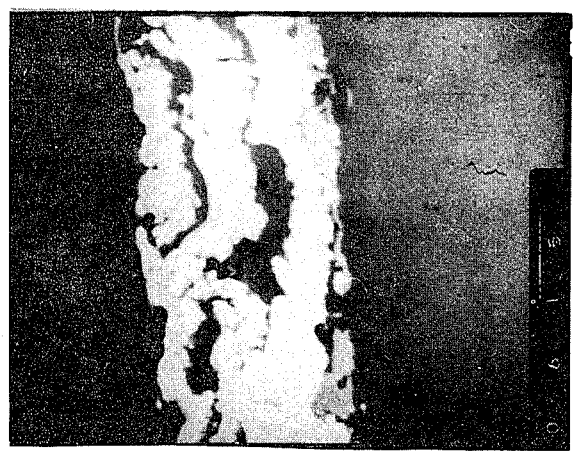
FIG. 6a and 6b are photographs, obtained by EPMA (electron probe micro-analyser), of the wire-explosion spray coating layer impregnated with $MoS_2$, FIG. 6a showing the composition image and FIG. 6b showing the characteristics X-ray image of molybdenum.
Figure 6B:
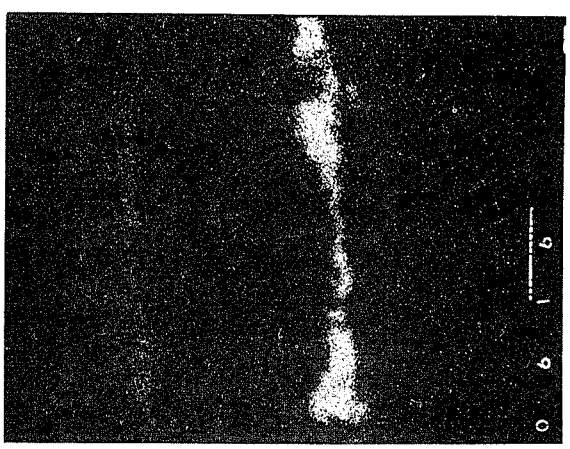

FIGS. 6a and 6b are electron probe microanalyzer photographs of a section of a coating formed by alternately and repeatedly wire-explosion spraying a piano wire and a tungsten wire onto a molybdenum bonding layer and impregnated with molybdenum disulfide, FIG. 6a showing the composition image and FIG. 6b showing the characteristic X-ray image of molybdenum. It will be seen from these photographs that the wire-explosion spray coating layer is impregnated with the molybdenum disulfide.

The impregnation of molybdenum disulfide particles into the wire-explosion spray coating layer was performed by impregnating the coating layer with a suspended solution of the molybdenum disulfide while giving a ultrasonic vibration of 10 KHz to the coating layer for a half-hour period. After the impregnating treatment, the coating layer was heat-treated at 170° C in the air atmosphere for one hour period to harden the binder of the molybdenum disulfide.

As seen from the above explanation, according to the method of this invention, a cylinder for use in an internal combustion engine having excellent wear resistance, peel resistance and seizure resistance characteristics can be obtained. Furthermore, effects attainable by this invention are as follows:

1. Since it is unnecessary to manufacture a liner and to insert it into the cylinder, it is possible to decrease the manufacturing cost of the cylinder compared with a liner type cylinder even after the cost of wire-explosion spray coating is taken into account.

2. The method of this invention is advantageous in connection with pretreatment, working time, aftertreatment, fraction defective, and necessary installation, compared with the case of plating cylinders with chromium. In this invention, therefore, it is possible to reduce manufacturing cost by about 40% or more compared with that of chromium plated cylinders.

3. There is no possibility of environmental pollution such as is caused by the waste liquor of a plating treatment.

4. Since the wire-explosion spraying can be electrically controlled, it is easy to manufacture products of uniform quality and to automate the manufacturing equipment to thereby accomplish inexpensive mass production.

5. By applying wire-explosion spray coated cylinders to an engine, it is possible to produce an engine which is lighter than engines having the conventional cylinders.

What is claimed is:

1. A method of forming an improved surface in the cylinder of an internal combustion engine comprising the steps of wire-explosion spray coating the inner surface of an aluminium alloy cylinder by using wire material selected from the group consisting of molybdenum wire, molybdenum-tungsten alloy wire and tungsten wire to form a bonding layer; alternately forming on said coating surface a layer which is formed by wire-explosion spraying a carbon steel wire to reinforce the sliding surface and a layer which is formed by wire-explosion spraying a wire of a material having good seizure resistance and wear resistance characteristics; and grinding and finishing the miltilayer-coated inner surface formed by the foregoing steps.

2. A method according to claim 1, wherein said wire having good seizure resistance and wear resistance characteristics is a molybdenum wire.

3. A method according to claim 1, wherein said wire having good seizure resistance and wear resistance characteristics is a molybdenum-tungsten alloy wire.

4. A method according to claim 1, wherein said wire having good seizure resistance and wear resistance characteristics is a tungsten wire.

5. A method according to claim 1, wherein said wire having good seizure resistance and wear resistance characteristics is a chromium wire.

6. A method according to claim 1, wherein said wire having good seizure resistance and wear resistance characteristics is a nickel-chromium alloy wire.

7. A method according to claim 1, wherein said wire having good seizure resistance and wear resistance characteristics is a titanium wire.

8. A method according to claim 7 wherein said carbon steel wire and said titanium wire are alternately wire-explosion sprayed on said bonding layer in a nitrogen gas atmosphere to alternately form and laminate two kinds of nitrogen layers.

9. A method according to claim 1, wherein after the formation of said bonding layer, an alloy wire material made from steel and material selected from the group consisting of molybdenum, tungsten, chromium and titanium is wire-explosion sprayed onto said bonding layer, whereby an inner surface coating in which the two components exist in mixed state is obtained.

10. A method according to claim 1, further including the step of bringing said finished wire-explosion spray coated inner surface into contact with a suspended solution selected from powdered molybdenum disulfide and tungsten disulfide while subjecting the inner surface to ultrasonic vibration so that the coating is impregnated with molybdenum disulfide or tungsten disulfide as a solid lubricant.

* * * * *